(12) United States Patent
Yoon et al.

(10) Patent No.: US 7,778,523 B2
(45) Date of Patent: *Aug. 17, 2010

(54) METHOD FOR REPRODUCING DATA RECORDED ON AN INTERACTIVE RECORDING MEDIUM IN CONJUNCTION WITH ASSOCIATED AUXILIARY DATA

(75) Inventors: Woo Seong Yoon, Kyonggi-don (KR); Jea Yong Yoo, Seoul (KR); Tae Ho Kim, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/511,591

(22) Filed: Jul. 29, 2009

(65) Prior Publication Data

US 2009/0290853 A1    Nov. 26, 2009

Related U.S. Application Data

(63) Continuation of application No. 11/613,042, filed on Dec. 19, 2006, which is a continuation of application No. 10/729,558, filed on Dec. 4, 2003, now Pat. No. 7,610,359.

(30) Foreign Application Priority Data

Dec. 7, 2002    (KR)    ...................... 10-2002-0077595

(51) Int. Cl.
*H04N 5/00*    (2006.01)
*H04N 7/00*    (2006.01)

(52) U.S. Cl. ............................ 386/95; 386/125; 386/98
(58) Field of Classification Search .................. 386/46, 386/92, 95, 125, 124, 96
See application file for complete search history.

(56) References Cited

U.S. PATENT DOCUMENTS 5,687,160 A    11/1997    Aotake (Continued)

FOREIGN PATENT DOCUMENTS

EP    0 737 009    10/1996

(Continued)

OTHER PUBLICATIONS

Chinese Office Action dated Aug. 31, 2007, for Application No. 200380100281.8, 11 pages.

(Continued)

*Primary Examiner*—Robert Chevalier
(74) *Attorney, Agent, or Firm*—Fish & Richardson P.C.

(57) ABSTRACT

A method for reproducing data recorded on an interactive recording medium in conjunction with associated auxiliary data is disclosed. An interactive recording medium reproducing apparatus reproduces A/V data recorded on an interactive recording medium such as an interactive DVD in conjunction with contents data provided by a contents providing server using navigation information for the contents data also provided by the contents providing server, thereby allowing synchronized reproduction of data from different sources.

6 Claims, 3 Drawing Sheets

U.S. PATENT DOCUMENTS

| | | | |
|---|---|---|---|
| 5,808,662 | A | 9/1998 | Kinney |
| 5,815,194 | A | 9/1998 | Ueda |
| 5,909,551 | A | 6/1999 | Tahara |
| 5,929,857 | A | 7/1999 | Dinallo |
| 5,987,525 | A | 11/1999 | Roberts |
| 5,995,091 | A | 11/1999 | Near |
| 6,061,680 | A | 5/2000 | Scherf |
| 6,130,988 | A | 10/2000 | Jeong |
| 6,138,175 | A | 10/2000 | deCarmo |
| 6,161,132 | A | 12/2000 | Roberts |
| 6,162,132 | A | 12/2000 | Yoneyama |
| 6,230,207 | B1 | 5/2001 | Roberts |
| 6,240,459 | B1 | 5/2001 | Roberts |
| 6,564,255 | B1 | 5/2003 | Mobini |
| 6,654,769 | B2 | 11/2003 | Ito |
| 6,735,152 | B2 | 5/2004 | Sato |
| 6,907,616 | B2 | 6/2005 | Yamauchi et al. |
| 6,957,387 | B2 | 10/2005 | Barbieri |
| 7,127,736 | B2 | 10/2006 | Kondo |
| 7,188,193 | B1 | 3/2007 | Getsin |
| 7,197,234 | B1 | 3/2007 | Chatterton |
| 7,216,149 | B1 | 5/2007 | Briscoe |
| 7,274,740 | B2 | 9/2007 | van Beek et al. |
| 7,313,809 | B1 | 12/2007 | Mohan |
| 7,376,333 | B2 | 5/2008 | Chung |
| 7,392,481 | B2 | 6/2008 | Gewickey |
| 7,448,021 | B1 | 11/2008 | Lamkin |
| 7,451,453 | B1 | 11/2008 | Evans |
| 7,466,904 | B2 * | 12/2008 | Yoo et al. .................. 386/125 |
| 2001/0056580 | A1 | 12/2001 | Seo |
| 2002/0037159 | A1 | 3/2002 | Goto |
| 2002/0049981 | A1 | 4/2002 | Tzou |
| 2002/0078144 | A1 | 6/2002 | Lamkin |
| 2002/0103855 | A1 | 8/2002 | Chatani |
| 2002/0106193 | A1 | 8/2002 | Park |
| 2002/0112247 | A1 | 8/2002 | Horner |
| 2002/0122658 | A1 | 9/2002 | Fukuda |
| 2002/0147827 | A1 | 10/2002 | Breiter |
| 2002/0152286 | A1 | 10/2002 | Peddu |
| 2003/0016943 | A1 | 1/2003 | Chung |
| 2003/0028892 | A1 | 2/2003 | Gewickey |
| 2003/0039187 | A1 | 2/2003 | Geutskens |
| 2003/0161615 | A1 | 8/2003 | Tsumagari |
| 2003/0229679 | A1 | 12/2003 | Yoo |
| 2004/0057699 | A1 | 3/2004 | Kim |
| 2004/0096199 | A1 | 5/2004 | Chou |
| 2004/0133661 | A1 | 7/2004 | Yoon |
| 2004/0247284 | A1 | 12/2004 | Yamasaki |
| 2004/0247294 | A1 | 12/2004 | Jung |
| 2005/0081699 | A1 | 4/2005 | Becker |
| 2005/0118417 | A1 | 6/2005 | Min |
| 2005/0210505 | A1 | 9/2005 | Chiu |
| 2006/0031188 | A1 | 2/2006 | Lara |
| 2006/0117344 | A1 | 6/2006 | Lamkin |
| 2006/0143268 | A1 | 6/2006 | Chatani |
| 2006/0242161 | A1 | 10/2006 | Kate |
| 2007/0122117 | A1 | 5/2007 | Kimura |
| 2008/0131093 | A1 | 6/2008 | Mohan |
| 2008/0177863 | A1 | 7/2008 | Mohan |

FOREIGN PATENT DOCUMENTS

| | | |
|---|---|---|
| EP | 0 762 422 | 3/1997 |
| EP | 1 003 304 | 5/2000 |
| EP | 1 193 712 | 4/2002 |
| EP | 1 229 542 | 8/2002 |
| EP | 1 357 749 | 10/2003 |
| JP | 06-141252 | 5/1994 |
| JP | 08102940 A | 4/1996 |
| JP | 08-223556 | 8/1996 |
| JP | 08-336104 | 12/1996 |
| JP | 09-128408 | 5/1997 |
| JP | 10-126314 | 5/1998 |
| JP | 10-136314 | 5/1998 |
| JP | 11-098467 | 4/1999 |
| JP | 11-161663 | 6/1999 |
| JP | 11-271071 | 10/1999 |
| JP | 2000-032429 | 1/2000 |
| JP | 2000099758 A | 4/2000 |
| JP | 2000-295578 | 10/2000 |
| JP | 2001223987 A | 8/2001 |
| JP | 2001285860 A | 10/2001 |
| JP | 2001-313930 | 11/2001 |
| JP | 2002-023719 | 1/2002 |
| JP | 2005-501363 | 1/2005 |
| JP | 2005-501364 | 1/2005 |
| JP | 2005-506785 | 3/2005 |
| KR | 10-0195106 | 6/1999 |
| KR | 10-2000-0030073 | 6/2000 |
| KR | 10-2002-0059706 | 7/2002 |
| KR | 10-2004-0049740 | 6/2004 |
| WO | WO 99/59290 | 11/1999 |
| WO | WO 00/63915 | 10/2000 |
| WO | WO 02/21529 | 3/2002 |
| WO | WO 02/50744 A2 | 6/2002 |
| WO | WO02063878 A3 | 12/2002 |
| WO | WO 03/019549 | 3/2003 |
| WO | WO 03/019557 | 3/2003 |
| WO | WO 2004/036575 | 4/2004 |
| WO | WO 2004/036576 | 4/2004 |
| WO | WO 2004/051644 | 6/2004 |
| WO | WO 2004/051644 A1 | 6/2004 |

OTHER PUBLICATIONS

European Search Report dated Oct. 17, 2007 for Application No. 07017018.8-2223, 7 pages.
European Search Report dated Oct. 17, 2007 for Application No. 03812704.9-2223, 3 pages.
European Search Report dated Sep. 12, 2008, for Application No. 03754279.2, 3 pages.
International Search Report dated Feb. 20, 2004 for Application No. PCT/KR2003/002257, 1 page.
International Search Report dated Feb. 20, 2004 for Application No. PCT/KR2003/002383, 1 page.
Japanese Office Action dated Dec. 28, 2007 for Application No. 2004-558505, 4 pages.
Japanese Office Action dated Dec. 28, 2007 for Application No. 2004-558505 (with English Translation), 13 pages.
Japanese Office Action dated Jun. 5, 2009 for Application No. 2004-558507 (in English), 5 pages.
Japanese Office Action dated Jun. 5, 2009 for Application No. 2004-558507, in English translation, 5 pages.
Japanese Office Action dated Oct. 17, 2008 for Application No. 2004-558505 (with English Translation), 13 pages.
Korean Office Action dated Feb. 29, 2008 for Application No. 10-2006-0137568 (with English Translation), 10 pages.
Korean Office Action dated Jan. 15, 2009 for Application No. 10-2002-0078023 (with English Translation), 12 pages.
Korean Office Action dated Jan. 20, 2009 for Application No. 10-2002-0077595 (with English Translation), 12 pages.
Korean Office Action dated Feb. 29, 2008 for Application No. 10-2006-0137568, 3 pages.
H. Mimura, *DVD-Video Format*, COMPCON '97 Proceedings, IEEE San Jose, CA USA Feb. 23-26, 1997, Los Alamitos, CA, USA, IEEE Comput. Soc. US, Feb. 23, 1997, pp. 291-294.
U.S. Office Action dated Jul. 17, 2007 for U.S. Appl. No. 10/729,558, 10 pages.
U.S. Notice of Allowance dated Jun. 10, 2008 for U.S. Appl. No. 10/729,558, 6 pages.
U.S. Notice of Allowance dated Oct. 7, 2008 for U.S. Appl. No. 10/729,558, 10 pages.

U.S. Office Action dated Jan. 23, 2009 for U.S. Appl. No. 10/729,558, 13 pages.
U.S. Office Action dated Apr. 16, 2009 for U.S. Appl. No. 10/729,083, 8 pages.
Japan Office Action dated Nov. 20, 2009 for Application No. JP2004-558507 (with English Translation), 9 pages.
Non-Final Office Action dated Dec. 9, 2009 for U.S. Appl. No. 12/534,334, 14 pages.
Japanese Office Action (with English translation) dated Jan. 8, 2010 for Application No. 2004-558505, 6 pages.

* cited by examiner

METHOD FOR REPRODUCING DATA RECORDED ON AN INTERACTIVE RECORDING MEDIUM IN CONJUNCTION WITH ASSOCIATED AUXILIARY DATA

CROSS-REFERENCE TO RELATED APPLICATIONS

This application is a continuation of U.S. application Ser. No. 11/613,042, filed Dec. 19, 2006, now pending, which is a continuation of U.S. application Ser. No. 10/729,558, filed Dec. 4, 2003, now allowed, which claims the benefit of a foreign priority application filed in Korea as Serial No. 10-2002-0077595 on Dec. 7, 2002, all of which are incorporated by reference.

BACKGROUND OF THE INVENTION

1. Field of the Invention

The present invention relates to a method for reproducing A/V data recorded on an interactive recording medium in conjunction with contents data recorded thereon or contents data provided by a contents providing server connected through the Internet.

2. Description of the Related Art

High-density optical disks capable of recording large amounts of data are being widely used. The Digital Versatile Disc (DVD), which is a recording medium that is capable of recording large amounts of high-quality video data as well as digital audio data, is one example of these high-density optical disks.

The DVD includes a navigation data recording area in which navigation data required for playback control of A/V data is recorded and a data stream recording area in which digital data streams are recorded.

When a DVD is loaded into a DVD reproducing apparatus, the DVD reproducing apparatus first reads the navigation data recorded in the navigation data recording area and stores the navigation data in an internal memory. The DVD reproducing apparatus then begins reproduction of the DVD using the stored navigation data, thereby providing various functions of the DVD to a viewer.

The development of new interactive DVDs is being progressing rapidly. Unlike the DVD, the interactive DVD (I-DVD) contains additional contents data, which is detailed information about A/V data recorded thereon and provides the contents data through a user interface. The contents data may be recorded on the I-DVD as html files.

In addition, a method for obtaining additional contents data from a contents providing server connected through the Internet while reproducing A/V data and contents data recorded on the I-DVD is under discussion. However, a method for effectively managing reproduction of A/V data and contents data responsive to a viewer's request is not yet available.

SUMMARY OF THE INVENTION

It is an object of the present invention to provide a method for reproducing data recorded on an interactive recording medium in conjunction with contents data provided by a contents providing server using navigation information for the contents data also provided by the contents providing server.

The method for reproducing A/V data recorded on an interactive recording medium in accordance with the present invention comprises the steps of (a) receiving playback control information for the A/V data from a contents providing server and storing the received playback control information and (b) presenting the A/V data reproduced from the interactive recording medium in conjunction with additional contents data received from the contents providing server using the stored playback control information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
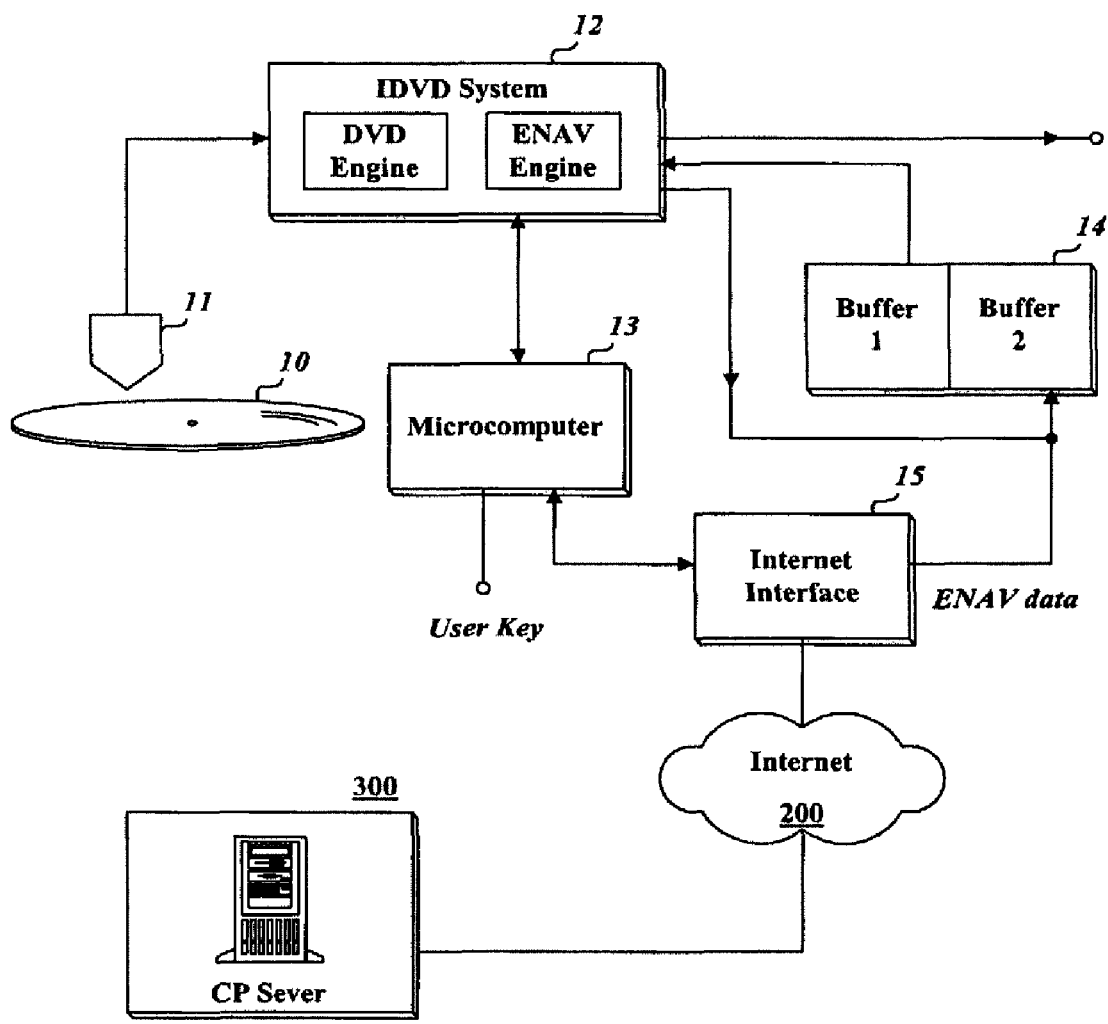
FIG. 1 illustrates an interactive optical disk reproducing apparatus in which the present invention may be advantageously embodied.

FIG. 1 illustrates an interactive optical disk reproducing apparatus in which the present invention may be advantageously embodied. The reproducing apparatus 100 comprises an optical pickup 11, an IDVD system 12, a microcomputer 13, a buffer memory 14, and an Internet interface 15 through which the apparatus 100 is connected to a contents providing server 300.

The IDVD system 12 includes a DVD engine for reproducing A/V data recorded on an I-DVD 10 and an enhanced navigation (ENAV) engine for reproducing contents data provided by the contents providing server 300 or contents data recorded on the I-DVD 10.

The IDVD system 12 outputs the contents data in synchronization with the A/V data from the IDVD 10. As shown in FIG. 1, the reproducing apparatus 100 is connected to the contents providing server 300 through the Internet interface 15 by the mutual operations of the microcomputer 13 and the ENAV engine included in the IDVD system 12.

ENAV contents data, which is additional contents data associated with the A/V data being reproduced from the I-DVD 10, is downloaded from the contents providing server 300 and then temporarily stored in the buffer memory 14. The buffer memory 14 can be logically divided into a first buffer (buffer 1) and a second buffer (buffer 2).

The ENAV engine in the IDVD system 12 outputs the A/V data from the I-DVD 10 in synchronization with the ENAV contents data from the I-DVD 10 or outputs the A/V data from the I-DVD 10 in synchronization with the ENAV contents downloaded from the contents providing server 300.

The contents providing server 300 provides various ENAV contents data associated with the A/V data recorded on the I-DVD 10 as a plurality of data files and provides ENAV navigation information for synchronizing the A/V data with the data files. The navigation information may be provided all at once or may be divided into a plurality of pieces and provided one by one when needed.

Figure 2:
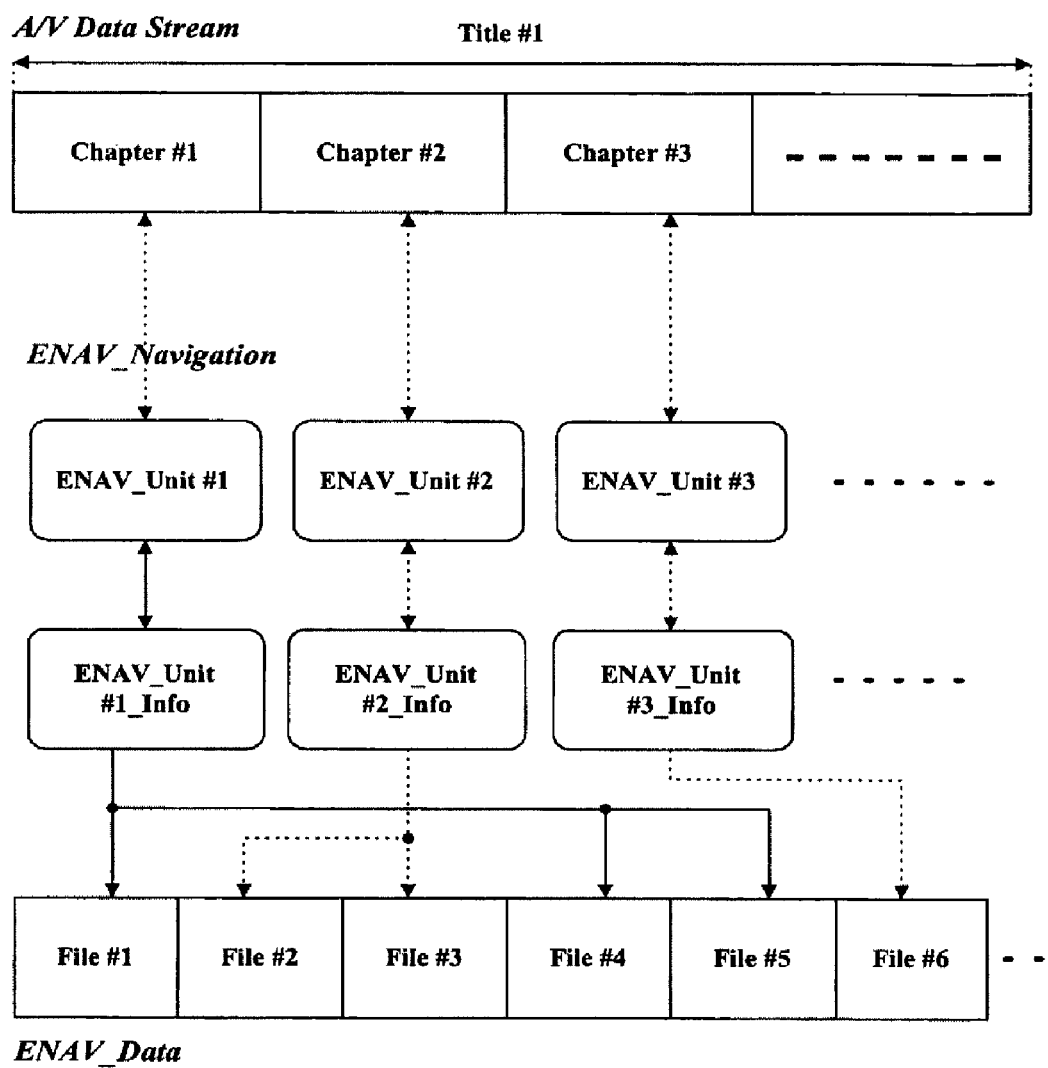
FIG. 2 illustrates the relationship among an A/V data stream, contents navigation information, and contents data files in accordance with the present invention.

As shown in FIG. 2, for example, a title of the I-DVD 10 is organized into individual chapters (Chapter#1, Chapter#2, . . . ) and one or more data files (File#1, File#2, . . . ) corresponding to each of the chapters are organized as an ENAV unit. Navigation information for managing the data files included in the ENAV unit is provided as ENAV unit information (ENAV_Unit_Info).

The multiple pieces of ENAV unit information (ENAV_Unit#1_Info, ENAV_Unit#2_Info, . . . ) are defined as a linked list and transmitted along with the ENAV contents data files or transmitted before the ENAV contents data files are sent.

Figure 3:
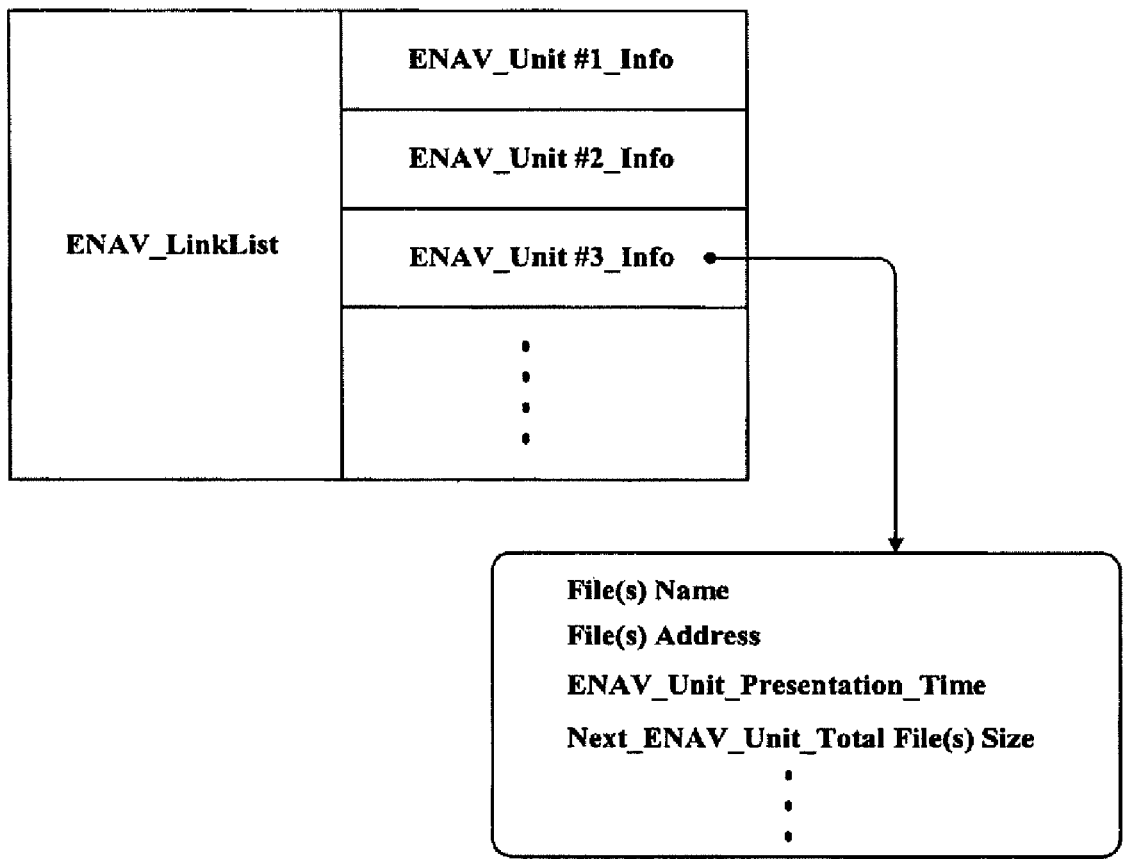
FIG. 3 illustrates an embodiment of contents navigation information in accordance with the present invention.

As shown in FIG. 3, the ENAV unit information includes file names of data files included in the associated ENAV unit (File(s) Name), addresses of the data files in the contents providing server 300 (File(s) Address), the presentation time of the associated ENAV unit (ENAV_Unit_Presentation_Time), and the total size of data files included in the next ENAV unit (Next_ENAV_Unit_Total File(s) Size).

The microcomputer 13 controls the DVD engine and the ENAV engine included in the IDVD system 12 using the ENAV unit information of the linked list provided by the contents providing server 300.

The microcomputer 13 correlates chapters of the A/V data stream reproduced by the DVD engine with data files reproduced by the ENAV engine using the fields of 'File(s) Name' and 'File(s) Address' included in the ENAV unit information.

In addition, the microcomputer 13 estimates the total presentation time of the ENAV unit being reproduced and determines if the total size of data files of the next ENAV unit exceeds the size of the remaining space of the memory buffer 14 using the fields of 'ENAV_Unit_Presentation_Time' and 'Next_ENAV_Unit_Total File(s) Size' included in the ENAV unit information. If the presentation of the ENAV unit being reproduced requires quite a long time and the memory buffer 14 has no remaining space, the microcomputer 13 sends a command to the contents providing server 300 to delay the transmission of the next ENAV unit data files by the contents providing server 300 for a prescribed time, for example, ½ of the estimated total presentation time of the current ENAV unit.

If the total size of data files of the next ENAV unit exceeds the size of the remaining space of the memory buffer 14, the microcomputer 13 sends a command to the contents providing server 300 for requiring that the contents providing server 300 transmit the data files of the next ENAV unit sequentially by organizing them into several groups or compress the data files before transmission so that the total size of the compressed data files may become less than a prescribed limit.

If the data files are compressed to be transmitted, the microcomputer 13 may present a desired compression rate to the contents providing server 300. For example, if the data files of the next ENAV unit need to be compressed by more than 30% to be stored in the memory buffer 14, the microcomputer 13 sends a desired compression rate of 30% to the contents providing server 300. If the compression rate is achievable, the contents providing sever 300 provides the data files after compression. Otherwise, the contents providing server 300 organizes the data files of the next ENAV unit into several groups and provides the groups sequentially.

By the aforementioned procedure, the interactive optical disk reproducing apparatus 100 can reproduce A/V data from the I-DVD 10 in conjunction with the ENAV contents data provided by the contents providing server 300.

One ENAV unit may correspond to more than one chapter and one chapter may correspond to more than one ENAV unit. The linked list may include other navigation information as well as the ENAV unit information and may be defined as other names such as ENAV playlist.

The method for reproducing data recorded on an interactive recording medium in conjunction with associated auxiliary data in accordance with the present invention allows synchronized reproduction of data from different sources in an interactive optical disk reproducing apparatus.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for reproducing Audio/Video data (AV data) and additional data associated with the AV data, the method being performed by a device and comprising:
   retrieving the AV data from a storage medium;
   obtaining listing information including a list of navigation information;
   obtaining the navigation information corresponding to the AV data using the listing information, wherein the navigation information includes identification information, location information, time information, and size information used for processing the additional data;
   receiving the additional data which is corresponding to the AV data from the storage medium using the identification information and the location information, wherein the identification information is an identifier assigned to the additional data, and the location information indicates where the additional data is located; and
   reproducing the additional data with the AV data using the time information and size information, wherein the size information is used for buffering the additional data on a buffer of the device, and wherein a single additional data is capable of being associated with plural AV data or plural additional data are capable of being associated with a single AV data.

2. The method of claim 1, wherein the additional data is configured for being reproduced with the AV data synchronously.

3. The method of claim 1, farther comprising determining when the additional data is transmitted to a decoder of the device through the buffer using the time information and the size information.

4. An apparatus for reproducing Audio/Video data (AV data) and additional data associated with the AV data, the apparatus comprising:
   a buffer;
   a controller configured to:
   retrieve the AV data from a storage medium,
   obtain listing information including a list of navigation information,
   obtain the navigation information corresponding to the AV data using the listing information, wherein the navigation information includes identification information, location information, time information, and size information used for processing the additional data,
   receive the additional data which is corresponding to the AV data from the storage medium using the identification information and the location information, wherein the identification information is an identifier assigned to the additional data, and the location information indicates where the additional data is located, and
   reproduce the additional data with the AV data using the time information and size information, wherein the size information is used for buffering the additional data on the buffer, and wherein a single additional data is capable of being associated with plural AV data or plural additional data are capable of being associated with a single AV data.

5. The apparatus of claim 4, wherein the additional data is configured for being reproduced with the AV data synchronously.

6. The apparatus of claim 4, further comprising at a decoder configured to decode the additional data, wherein the controller is further configured to determine when the additional data is transmitted to the decoder through the buffer using the time information and the size information.

* * * * *